United States Patent
Smith

Patent Number: 6,011,793
Date of Patent: Jan. 4, 2000

[54] SWITCHING APPARATUS FOR SIMULTANEOUSLY SWITCHING A PLURALITY OF SWITCH UNITS, WITH EACH SWITCH UNIT INCLUDING STORAGE REGIONS CORRESPONDING TO OTHER SWITCH UNITS

[75] Inventor: Graeme Roy Smith, Manchester, United Kingdom

[73] Assignee: Fujitsu Limited, Kawasaki, Japan

[21] Appl. No.: 08/678,235

[22] Filed: Jul. 11, 1996

[30] Foreign Application Priority Data

Jul. 11, 1995 [GB] United Kingdom ............ 9514093

[51] Int. Cl.⁷ ........................... H04L 12/56
[52] U.S. Cl. ........................ 370/363; 370/395
[58] Field of Search ................. 370/389, 390, 370/392, 395, 398, 376, 362, 363, 229, 235, 236, 364, 365, 375, 360

[56] References Cited

U.S. PATENT DOCUMENTS

| | | | |
|---|---|---|---|
| 4,569,040 | 2/1986 | O'Toole et al. | 370/58 |
| 5,233,603 | 8/1993 | Takeuchi et al. | 370/60 |
| 5,367,520 | 11/1994 | Cordell | 370/60 |
| 5,381,406 | 1/1995 | Yamashita | 370/376 |
| 5,535,197 | 7/1996 | Cotton | 370/395 |
| 5,654,965 | 8/1997 | Takahashi et al. | 370/390 |

FOREIGN PATENT DOCUMENTS

| | | |
|---|---|---|
| 0 405 530 | 1/1991 | European Pat. Off. |
| 88/07298 | 9/1988 | WIPO |

OTHER PUBLICATIONS

Lee et al., "Multicasting in a shared buffer memory switch," *Proceedings of the Region Ten Conference (IEEE Tencon '93)*, Oct. 19–21, 1993, vol. 1 of 5, pp. 209–212.

Fujitsu Limited Data Sheet, "MB86680—ATM Switch Element (SRE)," Draft Edition 0.13, Oct. 1993, pp. 1–30.

*Primary Examiner*—Chau Nguyen
*Attorney, Agent, or Firm*—Staas & Halsey

[57] ABSTRACT

A switching apparatus provides adaptive high-speed operation in an asynchronous transport mode (ATM) network. The switching apparatus includes a number of switch units, with each switch unit further including storage regions corresponding to other switch units. The switching apparatus has a writing phase in which a first switch unit stores received data in its storage region that corresponds to a second switch unit. During the writing phase, data is received by the first switch unit for later output by a second switch unit. Then, in a reading phase, the second switch unit retrieves the stored data from its corresponding storage region in the first switch unit and then outputs the retrieved data. In both phases, the switch units operate simultaneously under control of a control unit which monitors traffic flow conditions and selects data transfer paths within the switch to achieve optimum data throughput.

21 Claims, 11 Drawing Sheets

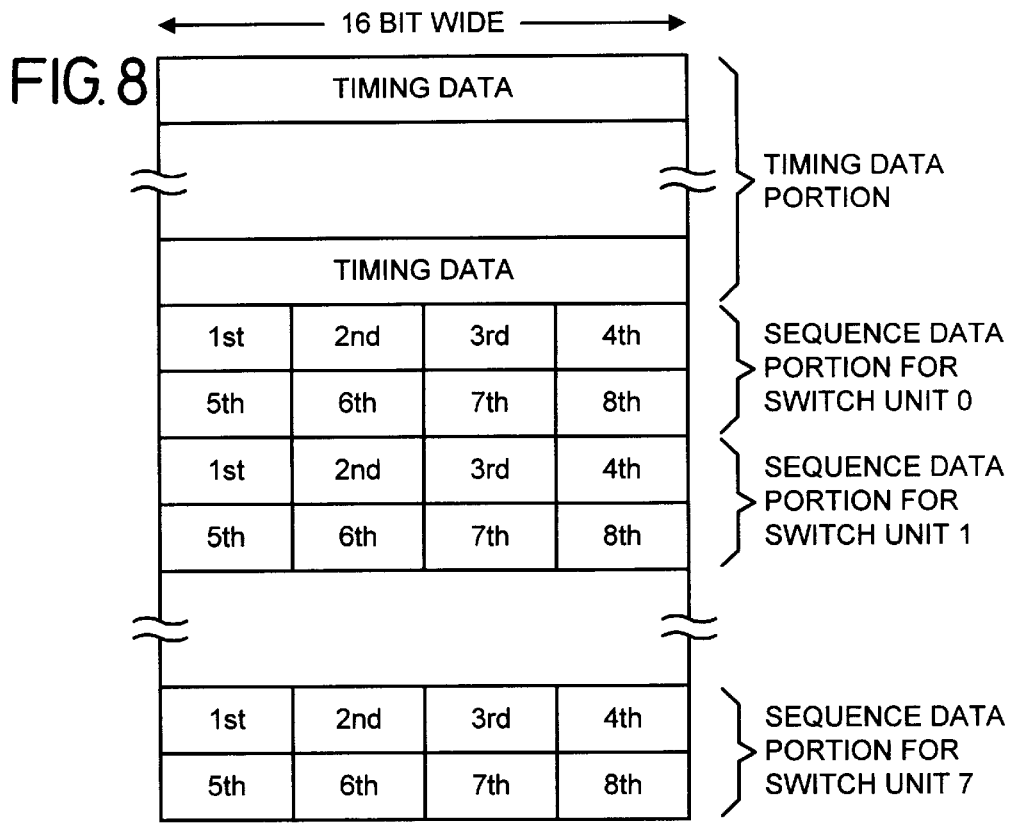

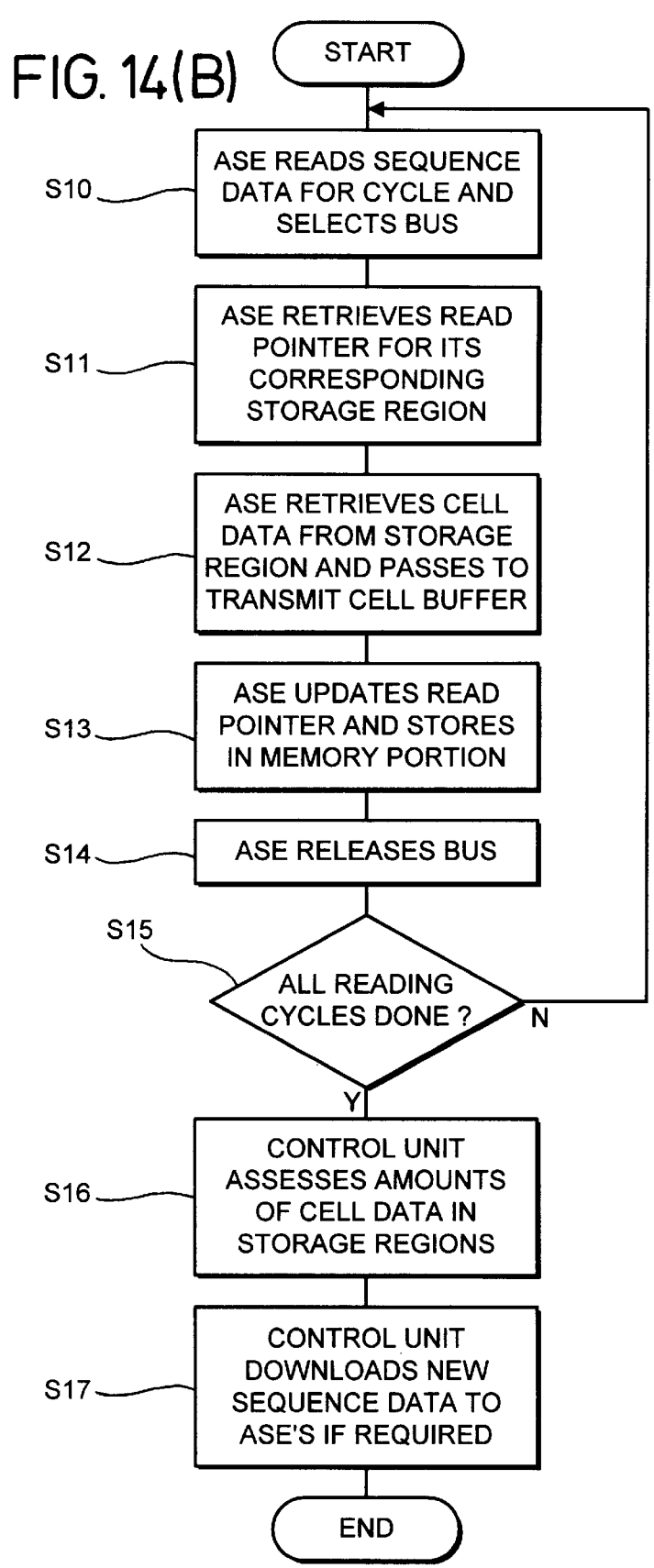

SWITCHING APPARATUS FOR SIMULTANEOUSLY SWITCHING A PLURALITY OF SWITCH UNITS, WITH EACH SWITCH UNIT INCLUDING STORAGE REGIONS CORRESPONDING TO OTHER SWITCH UNITS

BACKGROUND OF THE INVENTION

1. Field of the Invention

The present invention relates to a switching apparatus for use, for example, in switching data in asynchronous transport mode (ATM) networks.

2. Description of the Prior Art

FIG. 1 (PRIOR ART) of the accompanying drawings shows a block diagram of conventional switching apparatus 1 for use in an ATM network. In the FIG. 1 apparatus, a plurality of self-routing switch elements (SREs) 2 are connected together in matrix form. Each SRE 2 has four input ports I1 to I4 and four output ports O1 to O4. Within each individual SRE, 2 ATM cells received at any input port I1 to I4 can be routed to any output port O1 to O4, and a routing tag associated with each ATM cell passing through an SRE 2 is used to determine to which output port the cell concerned will be passed. Each output port has an associated first-in-first-out cell buffer having a storage capacity of, for example, 75 cells.

As shown in FIG. 1 (PRIOR ART) the SREs 2 are arranged in a matrix, so that in this example the overall switching apparatus has twelve input ports and 16 output ports. To facilitate such matrix-form connection, each SRE 2 has four regeneration outputs R1 to R4, which are associated respectively with the input ports I1 to I4 of the SRE 2 concerned, and also has four expansion ports E1 to E4 which are associated respectively with the output ports O1 to O4 of the SRE 2 concerned. Cells received at one of the input ports I1 to I4 are regenerated and retimed for output by the associated regeneration output ports R1 to R4. Cells received at one of the expansion ports E1 to E4 are inserted in the cell buffer of the associated output port O1 to O4.

The SREs 2 of the FIG. 1 apparatus are convenient to use in the illustrated matrix form because each SRE provides re-timed active outputs which allow direct connection to the nearest neighboring SREs. This eliminates the need for passive buses and reduces the interconnect problems between adjacent SREs at the printed circuit board level.

The number of switch elements required to form a switch having N input ports by N output ports is proportional to $N^2$, and hence the matrix configuration is only really appropriate for relatively small switching apparatuses, for example up to 32 input ports by 32 noutput ports. For larger switches, individual matrices 1 of the kind shown in FIG. 1 can be interconnected using a multipath delta arrangement as shown in FIG. 2 (PRIOR ART) of the accompanying drawings.

In FIG. 2 (PRIOR ART), the switching apparatus 5 comprises eight SRE matrices 1 of the kind shown in FIG. 1. Thus, each of the SRE matrices 1 in FIG. 2 contains a plurality of SREs 2 arranged in matrix form. The matrices 1 in FIG. 2 are arranged in two columns, and each matrix in the left-hand column has output ports connected respectively to the input ports of each SRE matrix 1 in the right-hand column, and vice versa.

The SRE matrices employed in the FIGS. 1 and 2 switching apparatuses have fixed bussing arrangements and fixed amounts of memory (typically the cell buffer associated with each output port of an SRE 2 has a storage capacity of 75 cells). Any increase in the size of the switching apparatus results in a square law increase in the number of SREs and also a square-law increase in the volume of "statistics" (i.e. traffic flow information) required to monitor the different switching nodes within the switching apparatus. Such an increase in the volume of statistics inevitably increases the processing demands on the switch controller.

Furthermore, as the number of switching nodes increases, there are more points at which congestion can occur. It is difficult to monitor all of these points simultaneously to assess the traffic flows and establish which source ports are leading to the congestion.

In addition, the cell delay variation (CDV) of an SRE matrix-based switch is proportional to the size of the switch.

A further problem is that the memory capacity of each SRE is fixed at some relatively limited value, and is not expandable to cope with different switch architectures.

BRIEF SUMMARY OF THE INVENTION

According to the present invention there is provided a switching apparatus comprising a plurality of switch units, each including memory means having storage regions corresponding respectively to the other switch units of the said plurality, the apparatus having a writing phase in which, when data is received by a first one of the switch units for output by a second one of the switch units, the first switch unit stores the received data in the storage region of its memory means that corresponds to the second switch unit, and also having a reading phase in which the second switch unit retrieves the stored data from its corresponding storage region in the first-switch-unit memory means and outputs that data.

In such switching apparatus the received data is transferred directly from the switch unit at which it is received to the switch unit from which it is to be output. Thus, the data is "stationary" once stored in the switching apparatus and does not get transferred from unit to unit a number of times as in the prior art switching apparatus described hereinbefore employing self-routing elements. This can avoid switching delays and problems of congestion and hence also reduce the cell delay variation (CDV) when the switching apparatus is used in an ATM network.

Furthermore, data transfer from the receiving switch unit to the output switch unit is entirely internal to the apparatus and can be performed at rates greater than the data rates of the communications lines/networks with which the switching apparatus is connected. Thus, switching delays and congestion are reduced still further.

In addition, the number of input/output nodes of the switching apparatus is simply equal to (or proportional to) the number of switch units so that if more input/output nodes are required the increase in the number of switch units required is linear and does not follow a square law as in the prior art matrix-form switching apparatus. The number of switching nodes within the apparatus also only increases linearly and so the volume of statistics data also only undergoes a linear (rather than square-law) increase. Thus, switching apparatus embodying the present invention is particularly advantageous and cost-effective when relatively large numbers of input/output nodes are required.

In the said writing phase the switch units are preferably operable simultaneously, each of them storing data received thereby, for output by another of the switch units, in the storage region of its memory means that corresponds to that other switch unit. Similarly, in the said reading phase any two or more of the switch units are preferably operable simultaneously to retrieve from their respective corresponding storage regions in other switch-unit memory means the data stored therein. Because the switch units operate in parallel in this way the throughput of data can be desirably high.

The apparatus preferably further includes control means connected to each of the switch units and operable to select plural switch-unit memory means pairs for use in the said reading phase, the switch unit of each pair being thereby designated to retrieve stored data from its corresponding storage region in the memory means of the pair concerned during the reading phase. This permits the apparatus to select the pairs intelligently and adaptively to achieve the maximum throughput of data and to avoid congestion.

The said reading phase may comprise a number of reading cycles. In this case the control means are preferably operable to select different switch-unit memory means pairs in different reading cycles of the same reading phase so as to enable each switch unit to retrieve the data destined for it from all the other switch units in turn. The said control means may also select at least one of the switch unit-memory means pairs in more than one reading cycle of the same reading phase to provide that pair (having, for example, a higher level of traffic than other pairs) with a longer data transfer period and hence allow for more data to be transferred via that pair than the other pairs.

The said writing and reading phases may be alternate or there may be a writing phase between two reading cycles of the same reading phase. The durations of each phase/cycle need not be equal and can be changed, for example by the control means, as required to achieve optimum throughput of data.

Preferably, the said control means are operable to select the switch unit-memory means pairs in dependence upon the traffic flow conditions in the apparatus. For example, the control means may include traffic flow monitoring means operable to monitor the amounts of data stored in each storage region of the memory means of the switch units, the control means employing the monitored amounts when making the selection of the switch unit-memory means pairs. This approach has the further advantage that switch statistics are also generated automatically because of the monitoring function of the control means.

When the apparatus is used in an ATM network, the control means can also take account of cell priorities when making the switch unit-memory means pair selections. Also, using its knowledge of traffic flows, when the apparatus is used in an ATM network the control means can also cause one of the switch units to send appropriate traffic management cells to the data source sending data to that switch unit to cause the source to "throttle back" its cell rate. Thus, potential congestion situations can be avoided.

The apparatus preferably further comprises bus means interconnecting the switch units, the said bus means including a plurality of individual bus line units, there being as many bus line units as there are switch units, and each switch unit being connected to all bus line units but the respective memory means of the switch units being connected only to different respective ones of the bus line units. Because there are as many bus line units as switch units, simultaneous (parallel) operations by all switch units are possible. Such bus means can provide simple connections between the different switch units that can be readily implemented at the printed circuit board level. The switch units may, for example, be arrayed one after the next in a column direction, with the bus lines running side-by-side in that column direction through the switch units or to one side of them.

The control means preferably synchronises the operation of the switch units to achieve efficient overall performance of the switching apparatus. In the reading phase the said control means are preferably operable to select the switch unit-memory means pairs such that in that phase all switch units that retrieve stored data simultaneously from their respective paired memory means do so via different bus line units, so as to avoid bus collisions during such simultaneous operation of the switch units. This avoids the need for separate collision avoidance logic circuitry which would be required if the different switch units could control their respective bus accesses independently of one another and asynchronously.

The said memory means of each switch unit are preferably employed to provide virtual first-in-first-out memory blocks corresponding respectively to the said storage regions, each block having respective write and read pointers, also stored in the memory means of the switch unit concerned, for use by the switch units when storing data in and retrieving data from the corresponding storage region. This enables a simple (and inexpensive even for large storage capacity) random access memory device to be used to provide the memory means instead of, for example, a dedicated first-in-first-out device.

In one preferred embodiment, each switch unit has multicast handling means operative, when multicast data is received by the switch unit concerned for output by a plurality of designated other switch units, to store the received multicast data in the storage region of its memory means that corresponds to just a first one of those designated switch units and to store in the storage regions corresponding respectively to the remaining designated switch units a multicast address pointer indicating the location of the multicast data in the storage region corresponding to the first designated switch unit. This avoids the requirement for the multicast data be to written several times over to the different storage units corresponding respectively to the designated multicast switch units and accordingly efficiency is increased. A dedicated multicast storage region can be provided in each memory means instead, any multicast data being written into that region alone and multicast address pointers being stored in the storage regions of all the designated multicast switch units.

In another embodiment, the said memory means each have respective writing and reading ports and are adapted such that data can be written to the said writing port at the same time as data is retrieved from the said reading port; the reading port of the memory means of each switch unit being connected to all other switch units, but the writing port of the memory means of each switch unit not being connected to any other switch units. Thus, in the said reading phase data received by each switch unit can be stored in the memory means of the unit concerned whilst previously-stored data is retrieved from that memory means by another switch unit. Accordingly, the writing phase may overlap with the reading phase.

Each switch unit may include a switch port control portion, connected to respective input and output ports of the switch unit, and operable when data is received at the said input port to produce a routing tag identifying the storage region in the switch unit's memory means in which the received data is to be stored. This routing tag is used by the switch unit to store the data in the required storage region of its memory means but it is not necessary, however, for the routing tag itself to be stored in the storage region (as well as the data) because the data is stationary once stored in the storage region and does not pass through many different switch units as in the prior art self-routing elements described above. Thus, transfer efficiency is increased and routing overheads and storage requirements are reduced.

Each switch unit preferably includes an adaptive switch element connected to the said control means for receiving therefrom bus control information, identifying the selected switch unit-memory means pairs for that switch unit in the said reading phase, and operable in accordance with that control information to activate the appropriate bus line units in turn over the course of the reading phase to facilitate data transfer from the memory means to the switch unit of each selected pair for the switch unit concerned. By providing such an adaptive switch element in each switch unit, to carry out low-level bus sequencing and other operations on behalf of the control means, the control means can be left to perform the necessary high-level tasks and monitor traffic flows.

BRIEF DESCRIPTION OF THE DRAWINGS

FIG. 8 shows an example of the format of control information in the FIG. 3 apparatus;

FIGS. 9(A) to 9(C) show tables for use in explaining how the operation of the FIG. 3 apparatus is modified in dependence upon traffic flow conditions;

FIGS. 14(A) and 14(B) shows respective flowcharts relating to operation of the FIG. 3 apparatus.

DETAILED DESCRIPTION OF THE PREFERRED EMBODIMENTS

Figure 3:
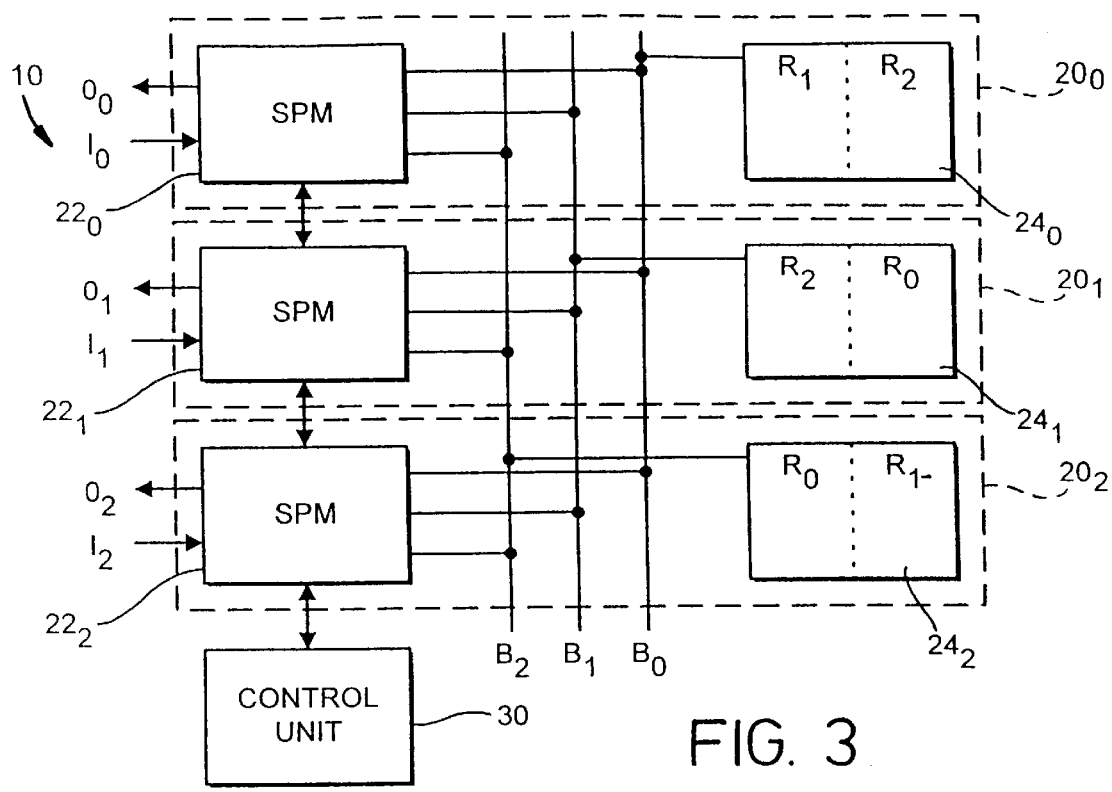
FIG. 3 shows a block diagram of ATM switching apparatus embodying the present invention.

In FIG. 3, ATM switching apparatus 10 embodying the present invention includes a plurality of switch units $20_0$ to $20_2$ and a control unit 30. The switch unit $20_0$ to $20_2$ have respective input ports $I_0$ to $I_2$ and respective output ports $O_0$ to $O_2$. Each switch unit $20_0$ to $20_2$ includes a switch port management (SPM) portion 22 which is connected to the input port I and the output port O of the switch unit concerned, and also includes a memory portion 24. Bus lines $B_0$ to $B_2$, each of which comprises data, address and control lines, serve to interconnect the SPM portions $22_0$ to $22_2$ and the memory portions $24_0$ to $24_2$. Whereas each SPM portion 22 is connected to all three bus lines $B_0$ to $B_2$, each memory portion 24 is only connected to one of the bus lines.

As shown in FIG. 3, each memory portion 24 is divided into two storage regions. In the case of the memory portion $24_0$ of the first switch unit $20_0$ the two regions are labelled $R_1$ and $R_2$ and correspond respectively to output ports $O_1$ and $O_2$ of the second and third switch units $20_1$ and $20_2$. In the case of the memory portion $24_1$ in the second switch unit $20_1$ the two storage regions are labelled $R_2$ and $R_0$ and correspond respectively to the output ports $O_2$ and $O_0$ of the third and first switch units $20_2$ and $20_0$. In the case of the memory portion $24_2$ in the third switch unit $20_2$, the two storage regions are labelled $R_0$ and $R_1$ and correspond respectively to the output ports $O_0$ and $O_1$ of the first and second switch units $20_0$ and $20_1$. Thus, it can be seen that the memory portion 24 of each switch unit 20 has storage regions corresponding respectively to the other switch units of the apparatus. Each storage region R serves as a sequential list or FIFO (first-in-first-out) unit.

The exemplary apparatus shown in FIG. 3 is simplified, for explanation purposes, and only shows three switch units and three bus lines. In practice, there would be more switch units and bus lines than this, for example eight bus lines in total.

Figure 4:
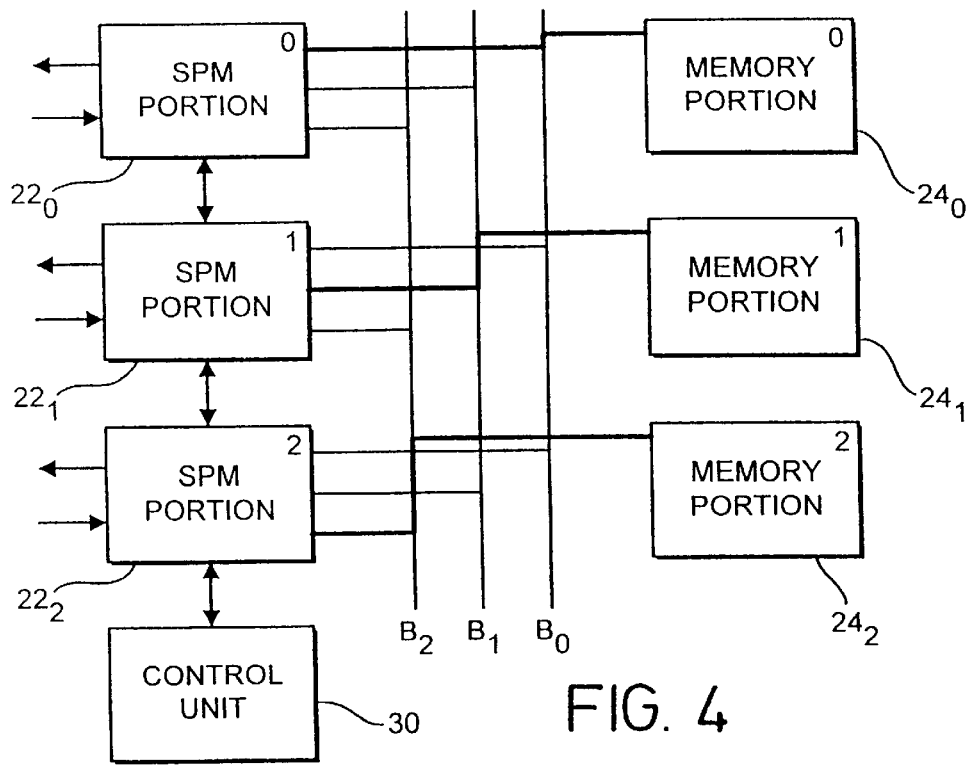
FIGS. 4 to 6 are block diagrams illustrating operation of the FIG. 3 apparatus at different operating phases.
Figure 5:
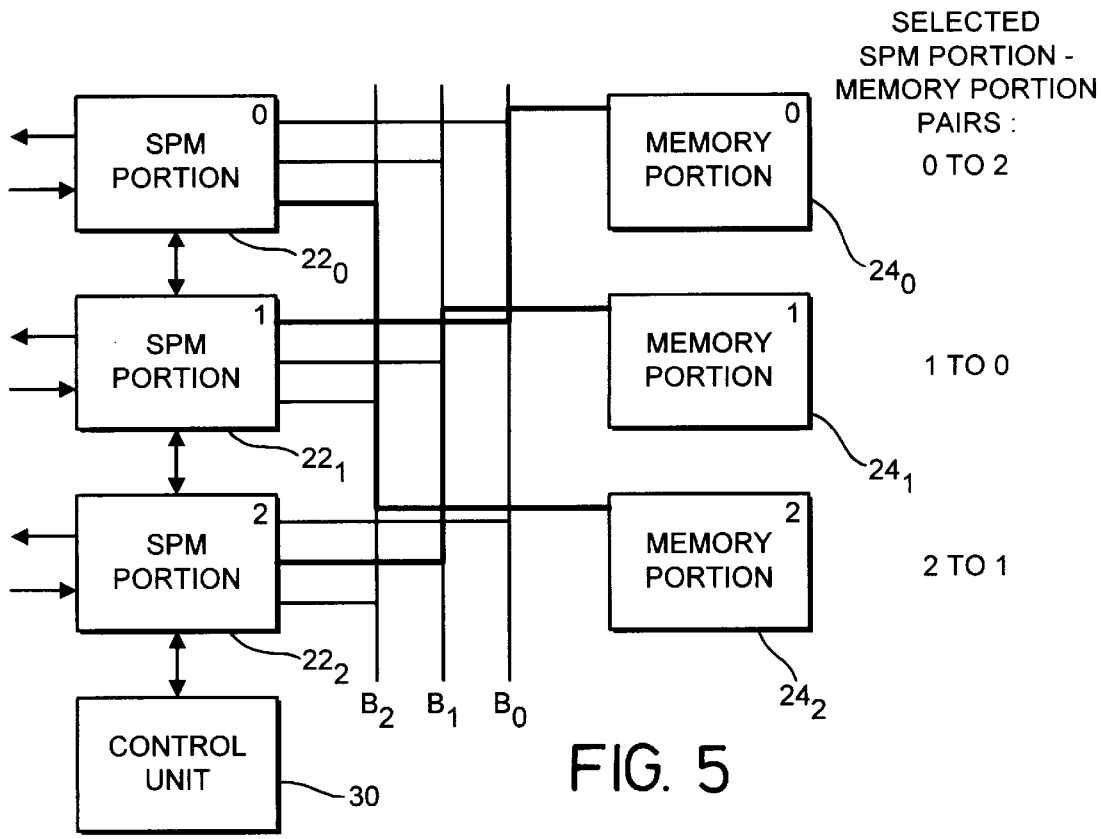

Operation of the FIG. 3 apparatus will now be explained with reference to FIGS. 4 to 6. In a first operating phase (writing phase), shown in FIG. 4, the SPM portion 22 of each switch unit 20 receives cells from its associated input port I. These cells will have an appended port number indicator, identifying the output port to which the cell is to be routed, and/or multicast indicator. Such a multicast indicator is used when cells received at one input port are to be routed to a plurality of different output ports, rather than to just a single output port. In response to receipt of each cell, the SPM portion 22 writes the cell to the next consecutive free locations in the relevant storage region R of the memory portion 24 in its own switch unit 20. This process is being performed simultaneously by the other SPM portions, each SPM portion using a different one of the bus lines $B_0$ to $B_2$ as shown by the bold lines in FIG. 4. For example, when a cell is received at input port $I_1$ and is destined for output channel $O_2$, the SPM portion $22_1$ in switch unit $20_1$ stores the cell concerned in storage region $R_2$ of the memory portion $24_1$ of its own switch unit $20_1$.

Then, operation switches to a reading phase. In a first cycle of the reading phase, illustrated in FIG. 5, the control unit 30 of the apparatus causes each SPM portion 22 to re-configure its bus selection so as to gain access to memory portions 24 in other switch units apart from its own. For example, as shown in FIG. 5, each SPM portion 22 now addresses the preceding switch unit's memory portion 24. Each SPM portion 22 therefore now reads cell data from its corresponding storage region in that memory portion, for example SPM portion $22_0$ reads cell data from storage region $R_0$ of memory portion $24_2$, SPM portion $22_1$ reads cell data from its corresponding storage region $R_1$ in memory portion $24_0$, and SPM portion $22_2$ reads cell data from storage region R2 in memory portion $24_1$.

Thus, plural switch unit-memory portion pairs are selected by the control unit for use in reading cell data, each pair having its own data transfer path using a different one of the bus lines $B_0$ to $B_2$.

Under the control of the control unit 30, in successive further cycles of the reading phase the SPM portions $22_0$ to $22_2$ could then be programmed to read the memory portions $24_0$ to $24_2$ in sequence on a modulo n basis (here n=3).

However, in a preferred embodiment of the present invention, the control unit 30 controls the accessing by the SPM portions of the memory portions in dependence upon the traffic flows at any given time. By monitoring the number of cells written to the storage regions and the number of cells that are read out, the control unit 30 is able to calculate where potential sources of congestion will occur and program the SPM portions to allow certain SPM portion-memory portion paths to be established for longer periods, so reducing potential congestion situations.

Figure 6:
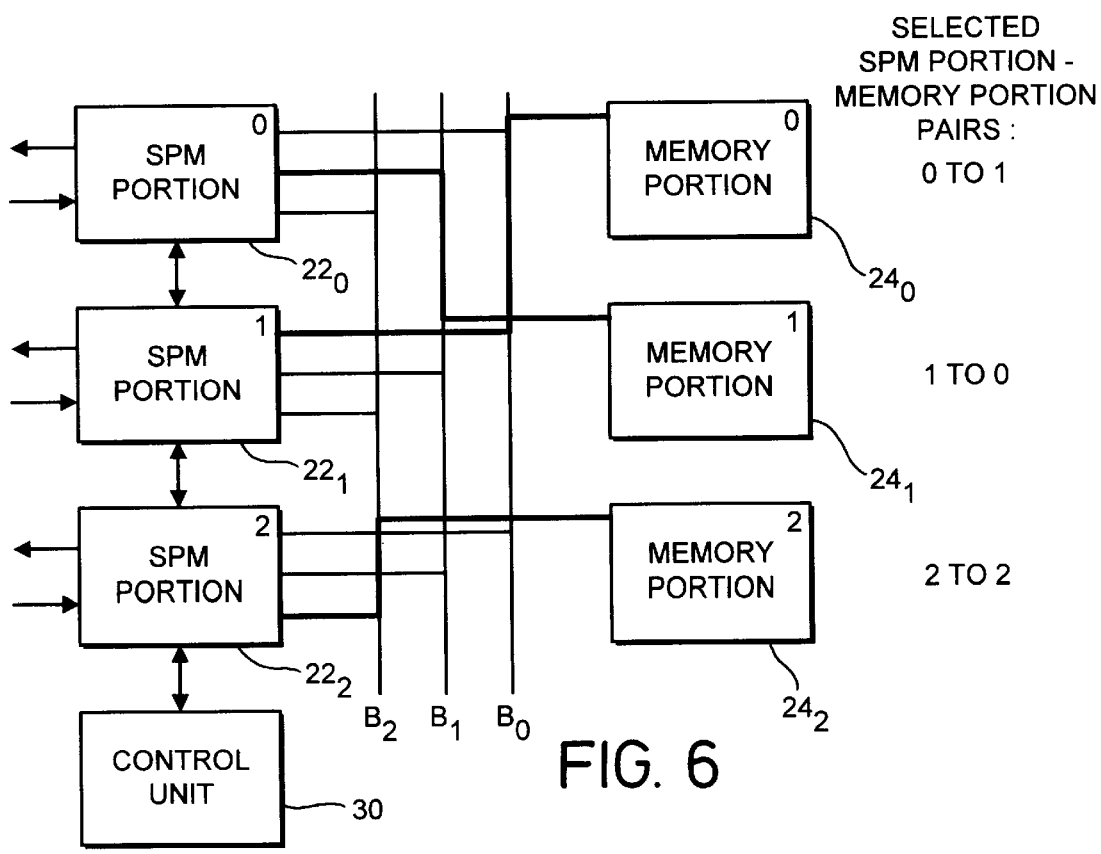

By way of example, FIG. 6 illustrates one possible traffic flow scenario in which there is a relatively large amount of traffic arriving at input port $I_0$ for output via output port $O_1$. In this case, the control unit 30 detects that traffic is accumulating undesirably in storage region $R_1$ of memory portion $24_0$. To deal with this situation, the control unit allows the path between SPM portion $22_1$ and memory portion $24_0$ to remain "open" when the next reading cycle starts following the first reading cycle shown in FIG. 5. Thus, although SPM portion $22_0$ is changed from accessing memory portion $24_2$ to accessing memory portion $24_1$, and SPM portion $22_2$ is changed from accessing memory portion $24_1$ to accessing memory portion $24_2$, the path established in the first reading cycle of FIG. 5, from SPM portion $22_1$ to memory portion $24_0$, remains open in FIG. 6. As a result, more cells can be transferred from memory portion $24_0$ to SPM portion $22_1$ to cope with the heavy traffic flow.

Accordingly, the control unit 30 can monitor the amounts of cell data stored in the different storage regions and calculate which SPM portion-memory portion paths need to be established in the reading phase to transfer the optimum amount of cell data and hence reduce any potential congestion problems. The control unit 30 comprises, for example, a microprocessor.

Details of the construction and operation of the FIG. 3 apparatus will now be given.

Figure 7:
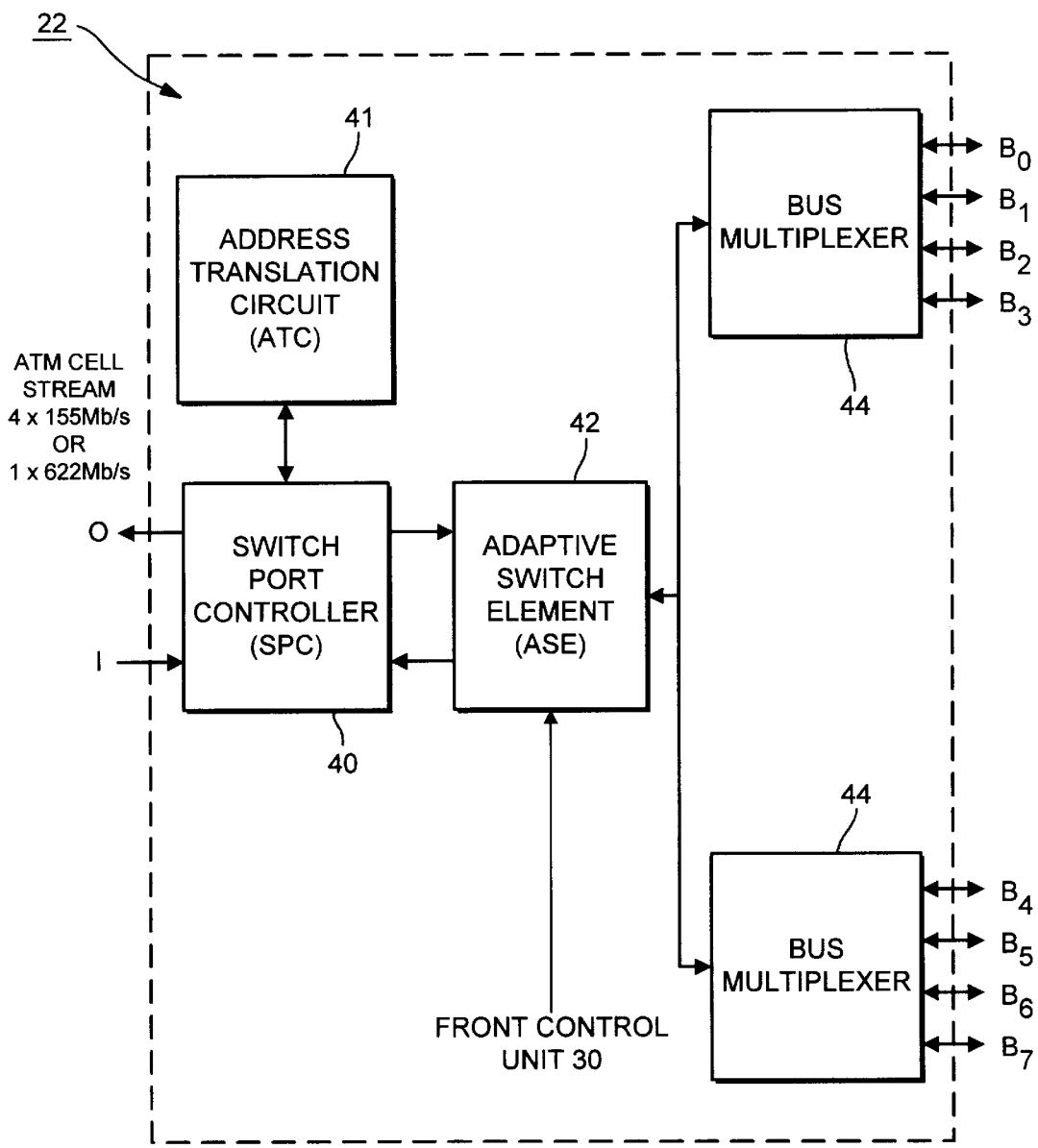
FIG. 7 shows a block diagram illustrating, in greater detail than FIG. 3, part of the FIG. 3 apparatus.

FIG. 7 shows a block diagram of one possible construction of each SPM portion 22. In the FIG. 7 example, the SPM portion 22 is intended to be used in switching apparatus having eight switch units in total, and eight bus lines $B_0$ to $B_7$.

The SPM portion 22 in FIG. 7 includes a switch port controller (SPC) unit 40, an address translation circuit (ATC) 41, an adaptive switch element (ASE) 42, and two bus multiplexer units 44. The SPC unit 40 is connected directly to the input and output ports I and o of the switch concerned. Each port can receive, or transmit as the case may be, a single 622 Mb/s ATM cell stream or four individual 155 Mb/s cell streams.

When an ATM cell is received by the SPC unit 40 the ATC unit 41 examines the addressing information (virtual path identifier (VPI) and virtual channel identifier (VCI) fields of the cell's header portion) carried by the cell and performs an appropriate address translation operation to determine to which output port the cell is to be routed. In accordance with the address translation information the SPC unit 40 appends to the cell the above-mentioned port number indicator and/or multicast indicator.

The ASE 42 then receives the cell concerned and controls its transfer to the memory portion 24 of its own switch unit. In the writing phase, the ASE 42 applies appropriate bus selection signals to the bus multiplexer units 44 to select just the bus line B to which the switch unit's own memory portion is connected. The upper bus multiplexer unit 44 in FIG. 7 relates to the first four bus lines $B_0$ to $B_3$, whilst the lower bus multiplexer unit 44 in FIG. 7 relates to the remaining four bus lines $B_4$ to $B_7$. For example, if the SPM portion shown in FIG. 7 is included in switch unit $20_2$, the required bus line is $B_2$ so the ASE 42 disables the lower bus multiplexer unit 44 and enables the upper bus multiplexer unit 44, and instructs that upper bus multiplexer unit 44 to provide for data transfer between bus line $B_2$ and the ASE 42. Once the bus selection has been made in this way, the received cell is transferred by the ASE to the storage region of the switch unit's own memory portion that corresponds to the required output port.

Upon completion of the writing phase, the ASE 42 switches to the reading phase. The ASE 42 receives from the control unit 30 control information specifying the memory portions which it is to address in each cycle of the reading phase. The ASE 42 employs this information to select the required buses $B_0$ to $B_7$ which will be needed in each different cycle to facilitate data transfer from the specified memory portion to the ASE 42. The ASE 42 makes the appropriate selections using the bus multiplexer units 44. Data read out from the memory portions is transferred by the ASE 42 to the SPC unit 40 and output via the output port O of the switch unit concerned.

Accordingly, in the reading phase the control unit 30 effectively controls, via the ASE 42 in each SPM portion 22, the operation of the bus multiplexer units 44 in the SPM portion concerned. The control unit 30 causes all bus switching by the different SPM portions 22 to occur at the same time to prevent bus collisions and consequent potential data corruption.

As indicated previously, the control unit 30 determines the SPM portion-memory portion pair selections for use in each cycle of the reading phase. FIG. 8 shows an example of the control information generated by the control unit 30 and sent to each switch unit to control its operation during the reading phase.

The control information includes an initial timing data portion. The timing data portion contains timing data used to determine the duration of each individual cycle of the reading phase. For example, such duration could be specified as 10 cells or 20 cells. This timing data is the same for all switch units. The durations of the individual cycles could be all the same, in which case the timing data is short, or different from one another.

The control information further includes sequence data portions for each switch unit. In the FIG. 8 example, each sequence data portion has eight entries. Thus, the FIG. 8 example corresponds to the FIG. 7 SPM portion 22 in which there are eight different memory portions and so each reading phase comprises eight reading cycles. The eight different entries correspond respectively to the eight reading cycles, and each entry accordingly indicates which memory portion the switch unit concerned is to access in the cycle concerned.

The control information is downloaded to the ASEs 42 in the switch units periodically by the control unit, enabling the SPM portion-memory portion pair selections to be modified in accordance with traffic flow conditions.

As described later in more detail, each ASE unit 42 includes a bus sequence register for storing the sequence data relating to its own switch unit, and also a timing register for storing the timing data.

The ability of the control unit to change the SPM portion-memory portion pair selections dynamically in response to traffic flow conditions is a major advantage of the FIG. 3 switching apparatus.

FIG. 9 shows further examples of SPM portion-memory portion pair selection possibilities in different traffic flow scenarios. In the table of FIG. 9(A), there are four SPM portions A to D, and four memory portions W to Z. Thus, SPM portion A and memory portion W form part of the same switch unit (20 in FIG. 3), SPM portion B and memory portion X form part of another switch unit, and so on.

Referring now to FIG. 9(B), in the first of these two traffic flow scenarios there is heavy traffic flow from the input port $I_B$ of SPM portion B to the output port $O_D$ of SPM portion D. In this case, the reading phase comprises three reading cycles having timeslots T1 to T3 respectively. The control unit 30 detects that a large amount of cell data is accumulating in the storage region $R_D$ of memory portion X corresponding to SPM portion D, and accordingly keeps the path between memory portion X and SPM portion D open over all three timeslots T1 to T3. The pair selections for the remaining SPM portions A to C and memory portions W, Y and Z change at each reading cycle in the cyclical manner shown in FIG. 9(B).

FIG. 9(C) relates to a second traffic flow scenario in which there are two dominant traffic flows, namely from the input port $I_C$ of SPM portion C to the output port $O_A$ of SPM portion A, and from input port $I_B$ of SPM portion B to output port $O_D$ of SPM portion D. In this case, the control unit 30 keeps the path from memory portion Y to SPM portion A, and the path from memory portion X to SPM portion D, open over all three timeslots T1 to T3. The paths between the other two SPM portions B and C and the other two memory portions W and Z are changed cyclically over the three timeslots, in this example timeslots T1 and T3 having identical path selections.

Ultimately, if congestion is unavoidable, the control unit 30 can instruct the relevant SPM portion to issue forward explicit congestion notification (FECN) cells, backward explicit congestion notification (BECN) cells or resource management (RM) cells to the source which is supplying data to the SPM portion concerned's input port so that the source would then temporarily "throttle back" cell generation.

Figure 10:
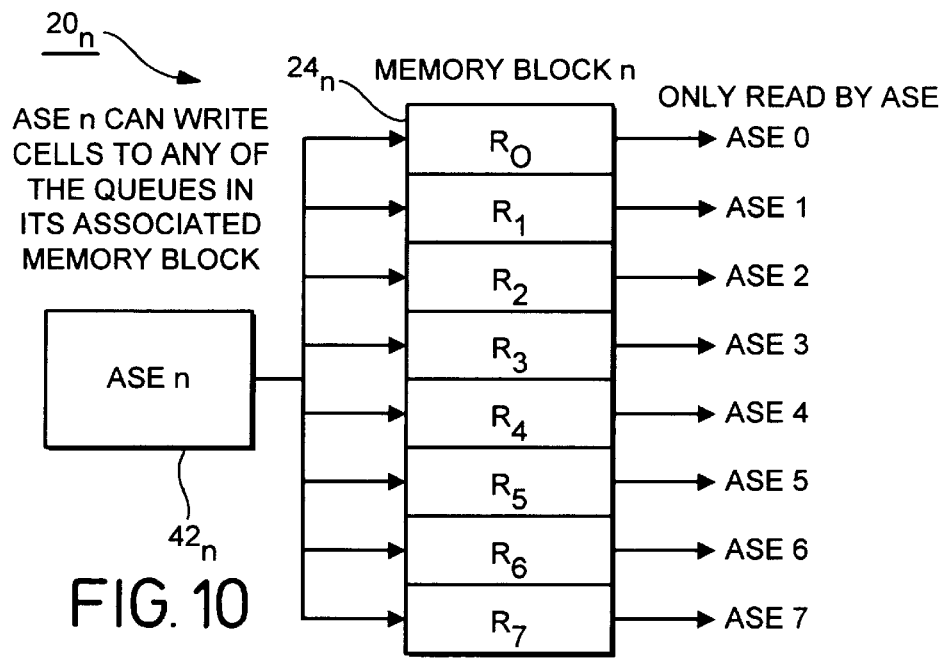
FIG. 10 shows a schematic diagram of a part of the FIG. 3 apparatus.

FIG. 10 is a schematic view of one of the switch units 20 in FIG. 3, indicating data transfers. The memory portion 24 in each switch unit 20 has its storage space divided equally by the number N of switch units in the apparatus. For example, if there are eight switch units in the apparatus then each memory portion will be divided into eight separate storage regions $R_0$ to $R_7$ of equal length. Strictly speaking, the storage space in each memory portion 24 should be divided into N-1 storage regions because an SPM portion does not need a storage region for its own switch unit in its own memory portion since this would only result in cells being written to that storage region and read back again by the same switch unit. Such writing and reading back might be useful in a test mode, or if loopback cells were required to be stored. However, these modes of operation are preferably performed instead by the SPC unit 40 in each SPM portion 22.

Each storage region $R_0$ to $R_7$ in FIG. 10 constitutes a virtual first-in-first-out (FIFO) unit, the FIFO providing a data queue for its corresponding switch unit in the switching apparatus. As shown in FIG. 10, an SPM portion is permitted only to write cell data to its associated memory portion, i.e. the memory portion in its own switch unit, whereas an SPM portion can read cell data from any of the memory portions, but only from the storage regions in those memory portions which correspond to the SPM portion concerned.

Figure 11:
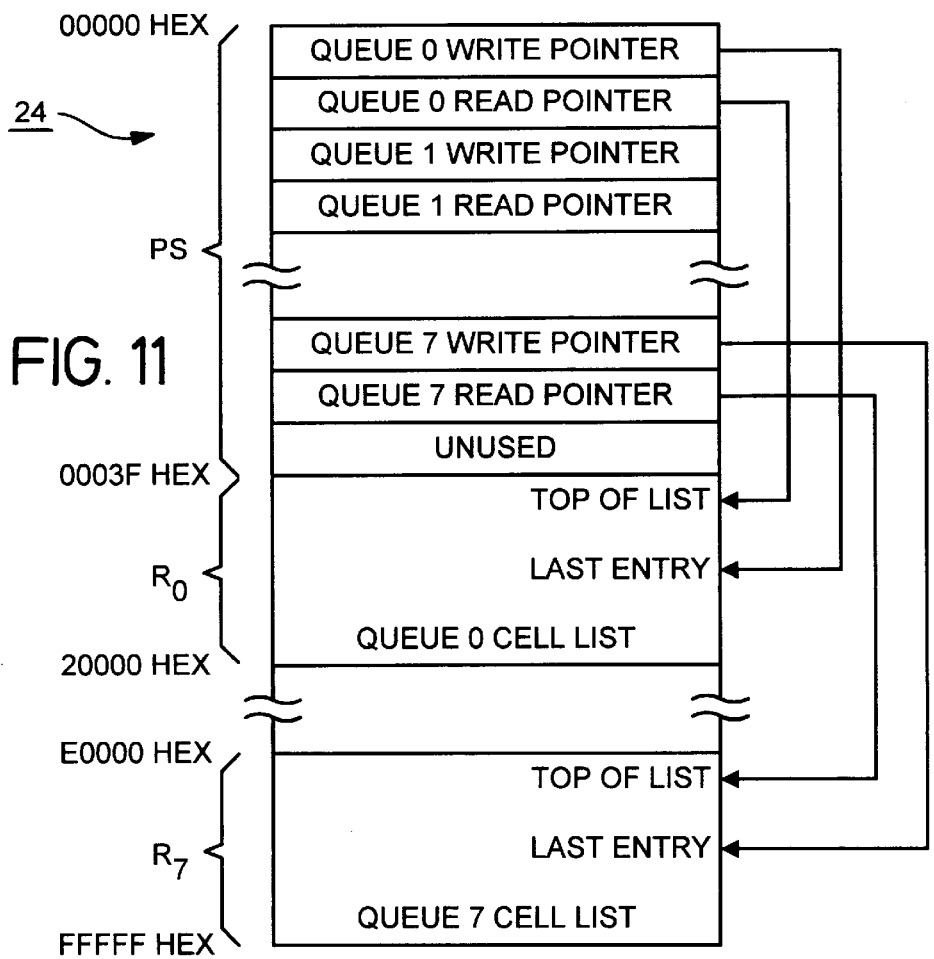
FIG. 11 shows an example of the format in which data is stored in the FIG. 10 part.

FIG. 11 shows in more detail one possible organisational structure of each memory portion 24. For each queue there are corresponding FIFO read and write pointers. These pointers are stored in a pointer storage portion PS of the memory portion itself as they need to be available to all SPM portions in the switching apparatus. These pointers are initialised, read and updated by the ASEs 42 in the SPM portions 22. The pointers are stored in the same locations in each memory portion to facilitate consistent operation across all switch units 20. This also makes for easier programming by the control unit 30.

Initially, the pointers and the size of each queue (storage region) within a memory portion are determined by the control unit 30. The control unit 30 initialises the read and write pointers for each queue via the respective ASEs 42 of the switch units.

After such initialisation, the ASEs 42 monitor and update the pointers as follows. Firstly, all the ASEs simultaneously read all of the read and write pointers from their associated memory portions. The ASEs store these pointers internally. Secondly, each ASE uses the pointers to establish the next read or write address for cells it is processing. When the cell transfers are complete for a particular writing phase or reading cycle (bus cycle) the ASE writes the new value for each pointer back to the relevant memory portion. This ensures that pointer integrity is maintained.

The control unit 30 monitors the queue levels by reading the pointer values stored in each ASE. The control unit then calculates the performance of the switching apparatus and determines the (optimum) SPM portion-memory portion pair selections for use in the reading phase and sends appropriate control information to the ASEs to bring about the required pair selections.

Although not shown in FIGS. 10 and 11, it would be possible to sub-divide each storage region into separate queues based on traffic priority, for example constant bit rate (CBR) services would have a highest-priority queue, variable bit rate (VER) services would have the next-highest-priority-queue and available bit rate (ABR) services would have the lowest-priority queue. Such sub-division is not, however, necessary; a more efficient approach is for the SPC unit 40 in each SPM portion to schedule the traffic to the ASE 42 of the SPM portion concerned based on the traffic priorities, the ASE then handling the traffic on a FIFO basis for its particular port.

Figure 1:
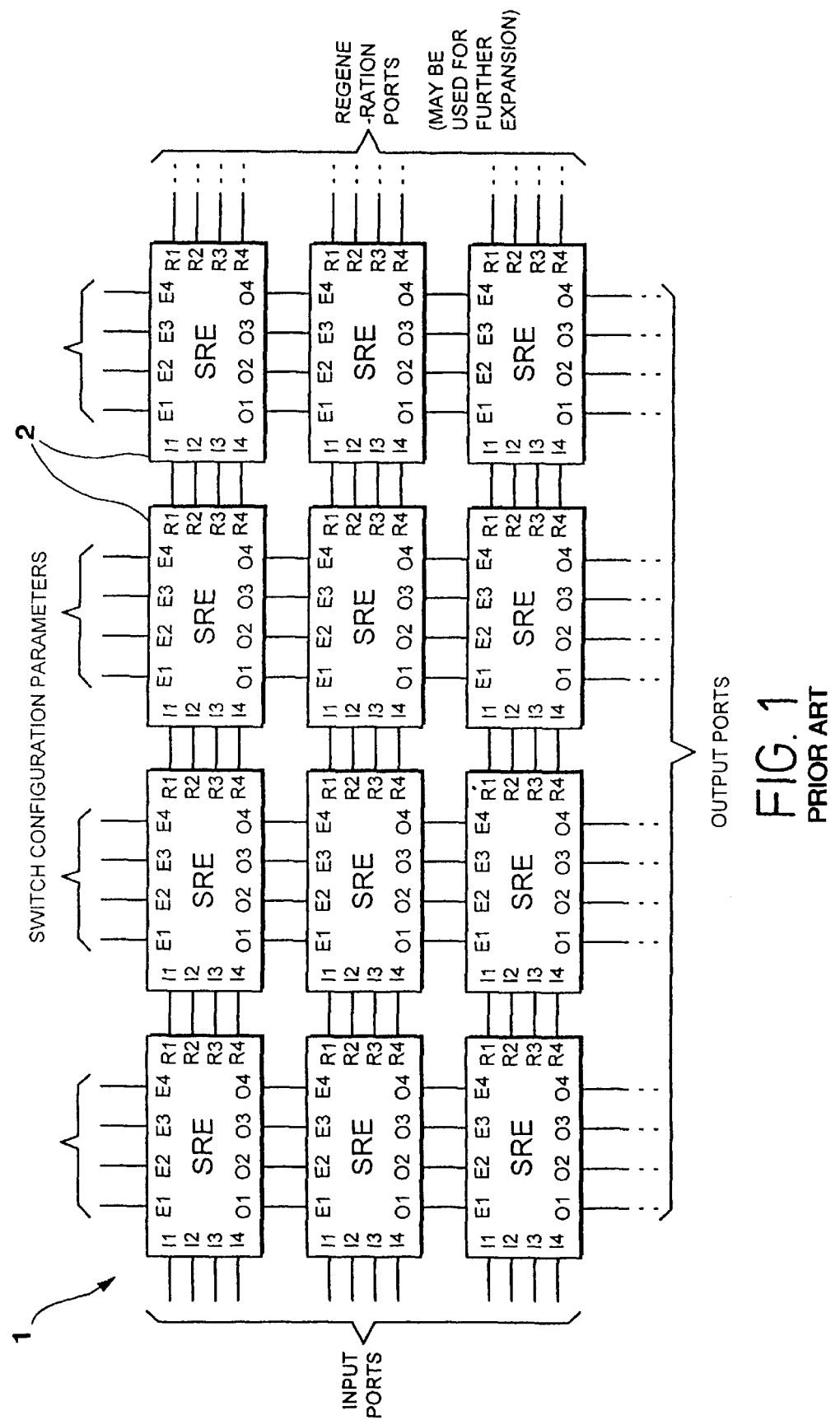
FIG. 1, discussed hereinbefore, shows a block diagram of a conventional ATM switching apparatus.
Figure 2:
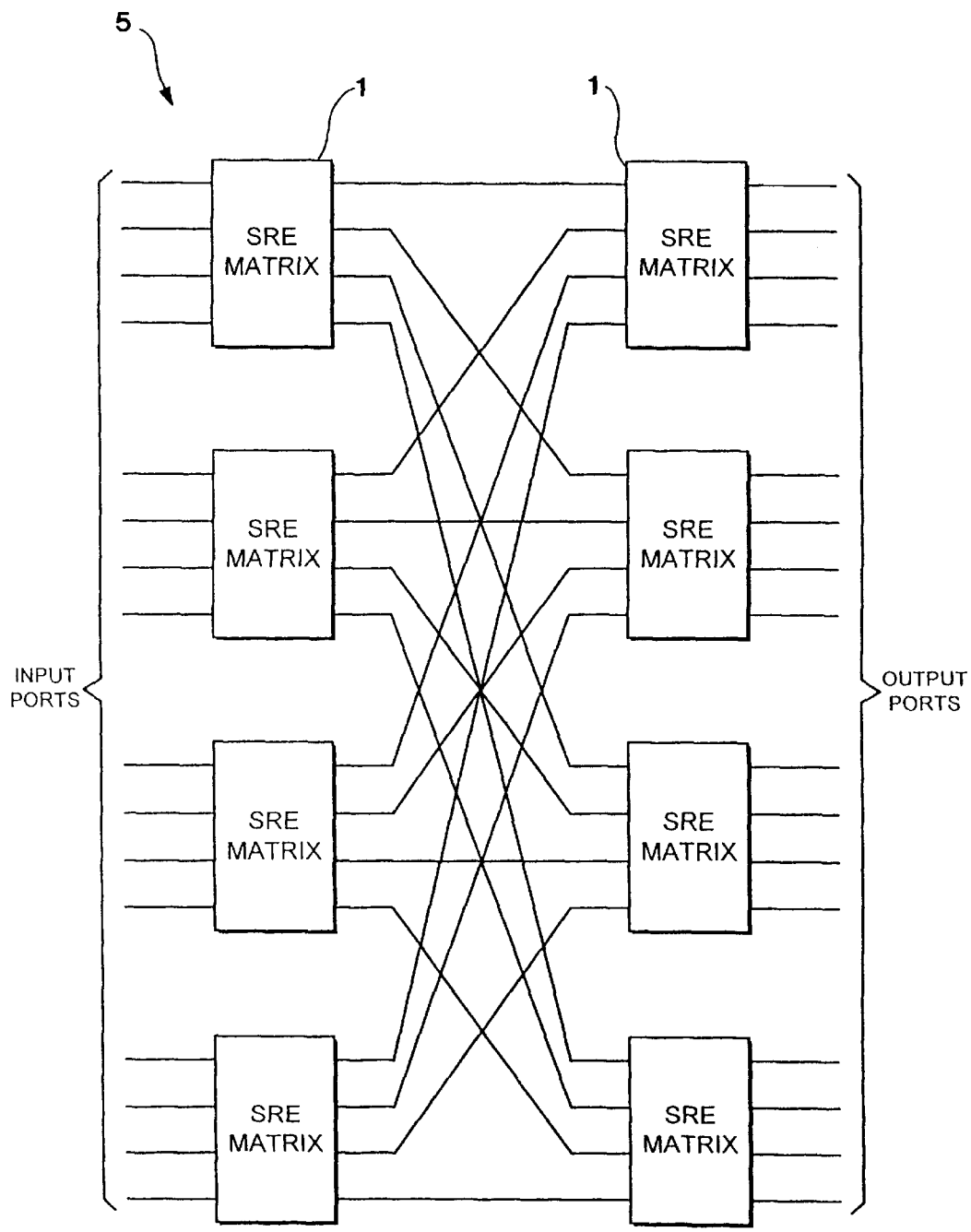
FIG. 2, also discussed hereinbefore, shows a further example of conventional switching apparatus.

In one example, each memory portion 24 has $2^{20}$ storage locations (i.e. the address bus in each bus line B is 20 bits in width), and each storage location comprises 32 data bits (i.e. the data bus in each bus line B is 32 bits wide). Thus, each memory portion 24 could be implemented in this case by a 4M byte random access memory (RAM) which can be of the static or dynamic type. If there are eight storage regions $R_0$ to $R_7$ in the memory portion, then since each ATM cell is 53 bytes in length, each storage region $R_0$ to $R_7$ can store up to 9892 ATM cells. The total storage capacity of a switch apparatus having eight switching units, each including a 4M byte memory portion, is 8×8×9892=633088 cells. This compares, incidentally, with a storage capacity of only 19200 cells for a 32×32 switch matrix constructed from self-routing-elements (SRE), as shown in FIG. 1.

Figure 12:
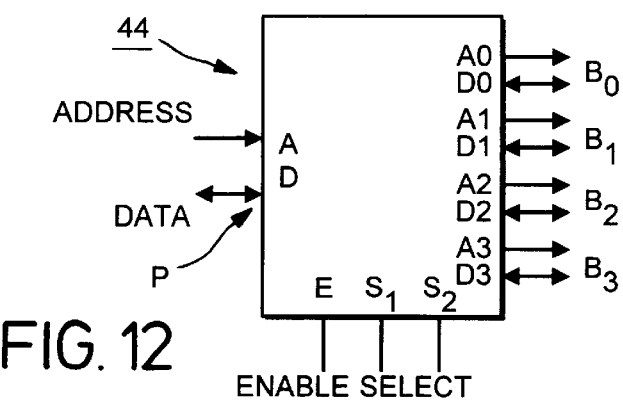
FIG. 12 shows a block diagram of a circuit element shown in FIG. 7.

FIG. 12 shows in more detail one possible implementation of each bus multiplexer unit 44 shown in FIG. 7. This bus multiplexer unit is required to respond to instructions from the ASE 42 with which it is connected to provide access to the memory portions for reading and writing of cell data. Typically, the number of bus lines will be a multiple of 4. For this reason, the preferred implementation of the bus multiplexer unit 44 shown in FIG. 11 is a four-way expandable bus multiplexer unit. This unit 44 is designed to route any one of four bus lines $B_0$ to $B_3$, each bus line comprising address A and data D buses, to a single port P connected with the ASE 42. The unit 44 is required to handle address transfer in one direction only (from the port P to the selected one of the buses $B_0$ to $B_3$) but is required to provide for bi-directional transfer of data.

The bus line $B_0$, $B_1$, $B_2$ or $B_3$ which will be used for address and data transfer is selected by the ASE 42 which applies a 2-bit selection signal to the selection inputs $S_1$ and $S_2$ of the unit.

If more than four bus lines are required, then two or more of the bus multiplexer units 44 can be arranged in parallel formation as shown in FIG. 7. Each unit then has an enable input E for receiving an enable signal E used to select the unit concerned.

The ASE port P of each bus multiplexer unit 44 is set to an open-circuit condition when the unit is not selected. This ensures that only one bus multiplexer unit 44 can apply data signals to the ASE at any given time.

Although not shown in FIG. 12, the signals used by the ASE to control data transfer between it and the memory portions (for example, read, write and chip select signals) also pass through the bus multiplexer unit.

Figure 13:
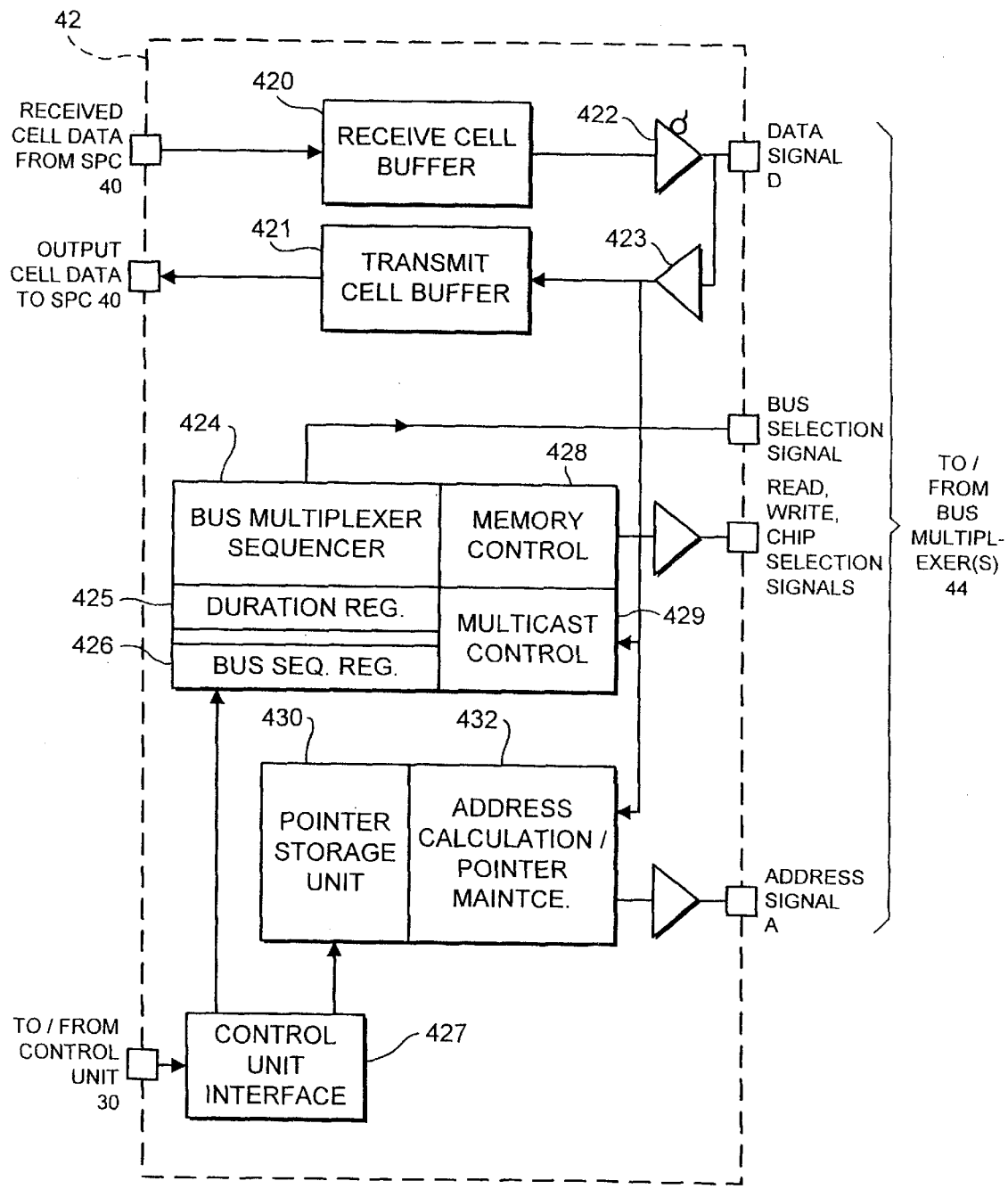
FIG. 13 shows a detailed circuit diagram of another circuit element shown in FIG. 7.

FIG. 13 shows a block diagram of parts of the ASE 42. The ASE 42 includes respective receive and transmit cell buffers 420 and 421 which are connected respectively to output and input ports of the SPC 40 (FIG. 7). Each buffer 420 or 421 is a FIFO device having a storage capacity of several ATM cells. Received cell data from the SPC 40 can be output from a bi-directional data signal port of the ASE, via tri-state output unit 422, to the (or each) bus multiplexer 44. Similarly, data received at that port from a bus multiplexer 44 can pass via input unit 423 to the transmit cell buffer 421 for output to the SPC 40.

The ASE 42 further includes a bus multiplexer sequencer unit 424 and associated duration and bus sequence registers 425 and 426. The duration and bus sequence registers 425 and 426 are connected to a control unit interface circuit 427 so that the control unit can download control information (FIG. 8) to the bus multiplexer sequencer unit 424. The timing data of that control information is stored in the duration register 425 and the sequence data relating to the switch unit (ASE) concerned is stored in the bus sequence register 426. Two sequence registers could be provided in the ASE instead of just one, to enable the control unit to update one register whilst the other register is being used by the ASE in the current reading cycle.

The bus multiplexer sequencer unit 424 generates appropriate bus selection signals which are applied to the bus multiplexer 44 to select the required buses for memory transfers and performs the required read and write operations using the selected memory portion.

A memory control unit 428 generates appropriate write, read and chip selection signals for controlling the accessed memory portion.

A multicast control unit 429 is also provided for controlling operation of the ASE 42 in response to receipt of multicast data. Such operation will be described later with reference to FIG. 14(A).

The ASE 42 further includes a pointer storage unit 430 which is connected to the control unit interface circuit 427 and also connected via an address calculation/pointer maintenance unit 432 to the data signal port of the ASE. The address calculation/pointer maintenance unit 432 also generates address signals A for application to the or each bus multiplexer unit 44.

When a read or write operation is to be performed by the ASE 42 the ASE retrieves from the memory portion to be used for the data transfer the relevant read or write pointer stored in the pointer storage region PS (FIG. 10) of the memory portion concerned. This pointer is stored temporarily in the pointer storage unit 430. The address calculation/pointer maintenance unit 432 then employs the pointer to generate the necessary address signals for application to the memory portion to read or write the cell data. After the operation is complete the relevant read or write pointer held in the pointer storage unit 430 is updated by the address calculation/pointer maintenance unit 432 and the updated pointer is written back to the pointer storage region PS of the memory portion concerned.

Figure 14A:
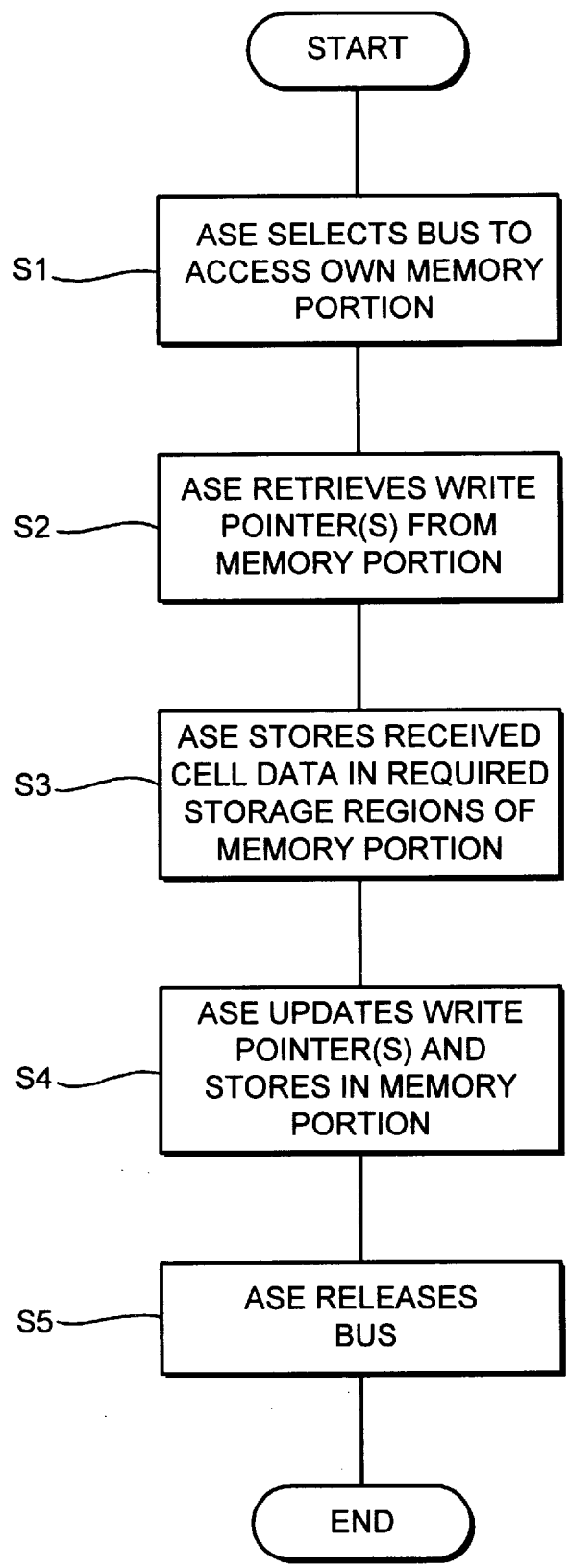

FIGS. 14(A) and 14(B) are flowcharts illustrating respectively the operation of the FIG. 3 apparatus in the writing and reading phases. As shown in FIG. 14(A) in the writing phase the ASE 42 in each switch unit 20 selects its own memory portion and makes the required bus selection for that memory portion (step S1). Then, in step S2 the ASE reads the relevant write pointer from its own memory portion and stores it temporarily in the pointer storage unit 430. Then, in step S3, received cell data from the SPC 40, currently stored in the receive cell buffer 420, is written to the relevant storage region within the switch unit's own memory portion. The routing tag appended to each cell by the SPC 40 to indicate the destination output port number is removed by the ASE 42 and only the ATM cell itself is stored in the memory portion. Removal of the routing tag is possible because the cell data remains "stationary" in the switching apparatus and, in the reading phase, the ASE that is reading knows that the data it is to output will always be found in its corresponding storage location within the memory portions of other switch units. Thus, transfer overheads are reduced and bus efficiency is increased.

After the write operation is complete, in step S4 the write pointer is updated and written back to the pointer storage region of the unit's own memory portion. Then, in step S5, the ASE releases the bus and the writing phase ends.

The above-mentioned step S3 is varied in the case in which the received cell data is multicast data, i.e. is intended to be directed to a number of different switch units. In this case, the SPC unit 40 of the receiving switch unit could simply repeatedly reproduce the cell data for each intended output switch unit and append a different routing tag to each lot of cell data. The same cell data would then be written in turn by the ASE to each relevant storage region in the switch unit's memory portion. Alternatively, the SPC unit 40 could apply a "multicast routing indicator" tag to the received cell data and the multicast control unit 429 in the ASE 42 could perform the repeated data writing into the different storage regions. However, in either case the ASE must occupy the memory portion of its own switch unit for a period equal to the time required to write the entire multicast cell data once to the memory block x the number of multicast output switch units.

In order to reduce the memory portion occupation time for multicast operations, in a preferred embodiment of the present invention the multicast control unit 429 in the ASE 42 responds to the multicast data indicator tag by writing the multicast data to a single "primary" storage region, which is the storage region (in its own memory portion) that corresponds to just one of the multicast output switch units, and in the storage regions corresponding respectively to the remaining multicast output switch units, simply write address pointers indicating the location in the primary storage region of the multicast data. It would also be possible to provide a dedicated multicast storage region within each memory portion for storing the multicast data.

FIG. 14(B) illustrates operation of the switching apparatus of FIG. 3 in the reading phase.

At the start of the reading phase the control unit 31 downloads to the ASEs 42 in the different switch units the necessary timing and sequence data for each cycle of the reading phase.

Accordingly, at the start of a reading cycle, in step S10 the ASE 42 in each switch unit selects the memory portion of another switch unit according to the sequence data held in its bus sequencing register 426 for the cycle concerned. The required bus selection for that memory portion is made.

Then, in step S11, the ASE retrieves from the pointer storage region PS of the selected memory portion the read pointer for the storage region in the selected memory portion which corresponds to the ASE's switch unit.

In step S12 the ASE 42 then reads cell data from the storage region concerned and transfers the data to the transmit cell buffer 421 from which it is output to the SPC unit 40.

In step S13 the read pointer is updated and written back to the pointer storage region of the selected memory portion. In step S14 the ASE 42 releases the bus and the current reading cycle ends.

In step S15 the ASE 42 checks whether all of the scheduled reading cycles for the current reading phase have been completed. If not, processing returns to step S10 for the start of the next reading cycle.

Otherwise, if it is determined in step S15 that the reading phase is complete, in step S16 the control unit 31 assesses the amounts of data in the storage regions of all of the memory portions and determines whether different SPM portion-memory portion pairs should be selected in the next reading phase. Any required changes in the selections are made in step S17 by downloading new control information to the ASE's 442. It would also be possible for the control unit to modify the pair selections part-way through a reading phase, if traffic flow conditions required urgent changes to those selections.

Figure 15:
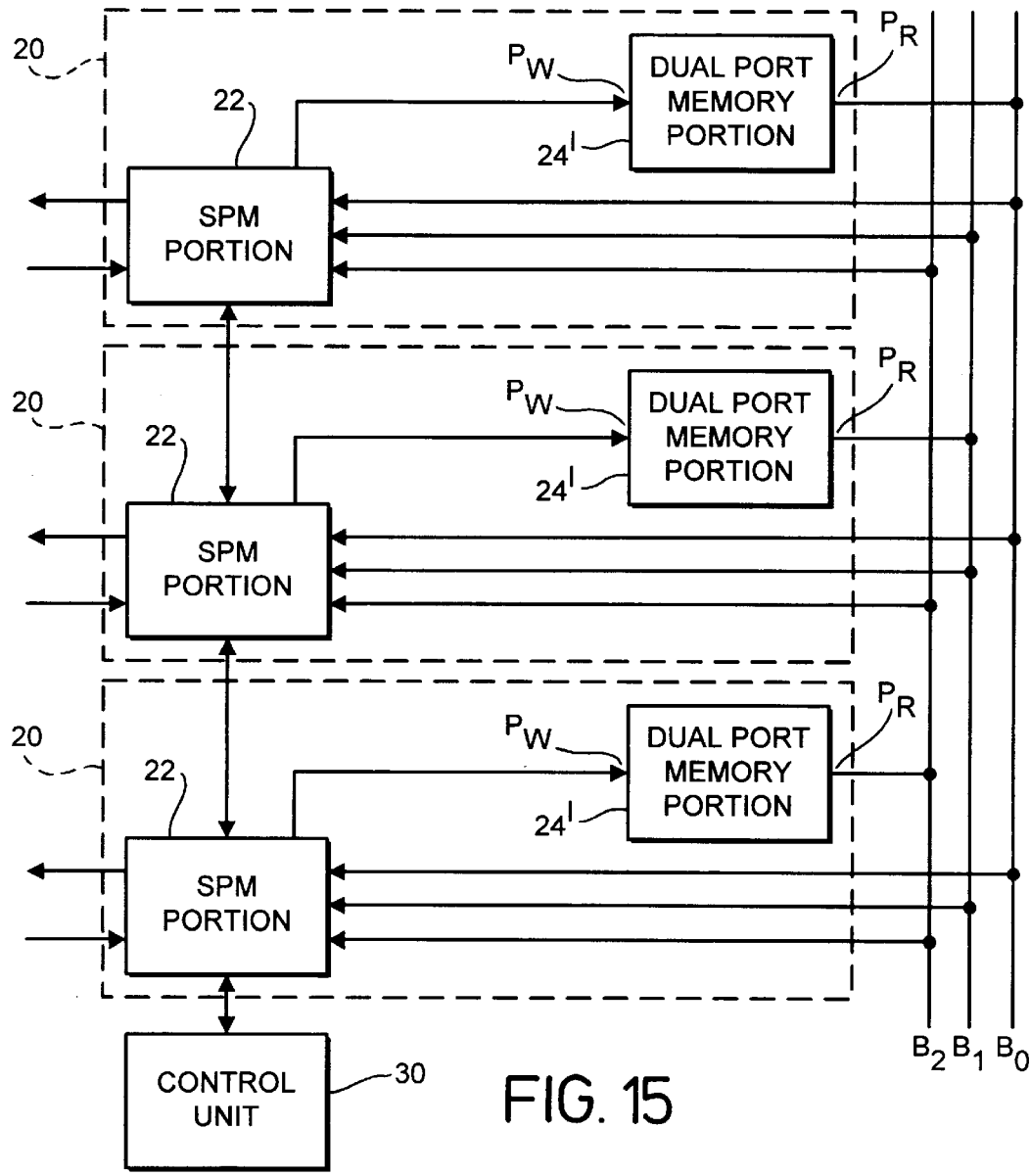
FIG. 15 shows a block diagram of further ATM switching apparatus embodying the present invention.

FIG. 15 shows a further example of switching apparatus embodying the present invention. As in the FIG. 3 apparatus, each switch unit 20 includes an SPM portion 22 and a memory portion 24'. In this case the memory portion 24' is a dual-port memory, for example a dual-port static random access memory, such as IDT 7026S/L 16K X 16 manufactured by Integrated Device Technologies, Inc. Each such dual-port memory portion 24' has a first port $P_W$ which is used exclusively for writing of cell data into the memory portion and a second port $P_R$ which is used exclusively for reading cell data from the memory portion. The write port $P_W$ is connected only to the SPM portion 22 of the switch unit 20 in which the memory portion 24' is located. This is because received cell data is always written to the switch unit's own memory portion. On the other hand, to enable any of the SPM portions to read each memory portion 24', the read port $P_R$ of each dual-port memory portion 24' is connected to a different one of the bus lines $B_0$ to $B_2$ and each of the SPM portions 22 has access to all three bus lines.

Although the embodiments described above are for use in switching ATM data it will be appreciated that the present invention can be used to provide switching apparatus for use in any application in which multiple input and output ports are required.

It is possible for the control unit, used to determine the SPM portion-memory portion pair selections, to take account of cell priorities as well as amounts of traffic. In addition, the control unit can be implemented by a neural network or other learning system so that the control unit can learn how to deal with different traffic flow situations and apply its accumulated knowledge when similar situations arise in the future.

What we claim is:

1. Switching apparatus comprising a plurality of switch units, each including a memory having storage regions corresponding respectively to the other switch units of said plurality, wherein the switch units are operable to perform simultaneous access operations in which two or more switch units access respective storage regions simultaneously, and in at least one such simultaneous access operation the accessed storage regions only correspond to different respective switch units, the switching apparatus having a writing phase in which, when data is received by a first one of the switch units for output by a second one of the switch units, the first switch unit stores the received data in the storage region of its memory that corresponds to the second switch unit, and also having a reading phase in which the second switch unit retrieves the stored data from its corresponding storage region in the first-switch-unit memory and outputs that data.

2. Apparatus as claimed in claim 1, wherein in said writing phase the switch units are operable simultaneously, each of them storing data received thereby, for output by another of the switch units, in the storage region of its memory that corresponds to that other switch unit.

3. Apparatus as claimed in claim 1, wherein in said reading phase any two or more of the switch units are operable simultaneously to retrieve from their respective corresponding storage regions in other switch-unit memories the data stored therein.

4. Apparatus as claimed in claim 3, further including control means connected to each of the switch units and operable to select plural switch unit-memory pairs for use in said reading phase, the switch unit of each pair being thereby designated to retrieve stored data from its corresponding storage region in the memory of the pair concerned during the reading phase.

5. Apparatus as claimed in claim 4, wherein said reading phase comprises a number of reading cycles and the control means are operable to select different switch unit-memory pairs in different reading cycles of the same reading phase.

6. Apparatus as claimed in claim 4, wherein said control means are operable to select at least one of the switch unit-memory pairs in more than one reading cycle of the same reading phase.

7. Apparatus as claimed in claim 3, wherein said writing and reading phases are alternate.

8. Apparatus as claimed in claim 5, wherein there is a writing phase between two reading cycles of the same reading phase.

9. Apparatus as claimed in claim 4, wherein said control means are operable to select the switch unit-memory pairs in dependence upon the traffic flow conditions in the apparatus.

10. The switching apparatus as claimed in claim 1, wherein said data is cell data of an asynchronous transfer mode network.

11. A switching apparatus, comprising:
   a plurality of switch units, each having storage regions corresponding respectively to the other switch units of said plurality, the apparatus having a writing phase in which, when data is received by a first one of the switch units for output by a second one of the switch units, the first switch unit stores the received data in the storage region that corresponds to the second switch unit, and a reading phase in which the second switch unit retrieves the stored data from its corresponding storage region in the first switch unit and outputs the data; and each switch unit including a switch port control portion, connected to respective input and output ports of the switch unit, and operable when data is received at said input port to produce a routing tag identifying the storage region in the switch unit's storage region in which the received data is to be stored.

12. A switching apparatus, comprising:

a plurality of switch units, each including memory having storage regions corresponding respectively to the other switch units of said plurality, the apparatus having a writing phase in which, when data is received by a first one of the switch units for output by a second one of the switch units, the first switch unit stores the received data in the storage region of its memory that corresponds to the second switch unit, and also having a reading phase in which the second switch unit retrieves the stored data from its corresponding storage region in the first switch-unit memory and outputs that data, wherein during said reading phase any two or more of the switch units are operable simultaneously; and control means connected to each of the switch units and operable to select plural switch unit-memory pairs for use in said reading phase, the switch unit of each pair being thereby designated to retrieve stored data from its corresponding storage region in the memory of the pair concerned during the reading phase, said control means including traffic flow monitoring means operable to monitor amounts of data stored in each storage region of the memories of the switch units, the control means employing the monitored amounts when selecting the pairs.

13. A switching apparatus, comprising:

a plurality of switch units, each including memory having storage regions corresponding respectively to the other switch units of said plurality, the apparatus having a writing phase in which, when data is received by a first one of the switch units for output by a second one of the switch units, the first switch unit stores the received data in the storage region of its memory that corresponds to the second switch unit, and also having a reading phase in which the second switch unit retrieves the stored data from its corresponding storage region in the first switch-unit memory and outputs that data; and bus means interconnecting the switch units, said bus means including a plurality of individual bus line units, there being as many bus line units as there are switch units, and each switch unit being connected to all bus line units but the respective memories of the switch units being connected only to different respective ones of the bus line units.

14. A switching apparatus, comprising:

a plurality of switch units, each including memory having storage regions corresponding respectively to the other switch units of said plurality, the apparatus having a writing phase in which, when data is received by a first one of the switch units for output by a second one of the switch units, the first switch unit stores the received data in the storage region of its memory that corresponds to the second switch unit, and also having a reading phase in which the second switch unit retrieves the stored data from its corresponding storage region in the first switch-unit memory and outputs that data;

control means connected to each of the switch units and operable to select plural switch unit-memory pairs for use in said reading phase, the switch unit of each pair being thereby designated to retrieve stored data from its corresponding storage region in the memory of the pair concerned during the reading phase; and bus means interconnecting the switch units, said bus means including a plurality of individual bus line units, there being as many bus line units as there are switch units, and each switch unit being connected to all bus line units but the respective memory of the switch units being connected only to different respective ones of the bus line units, wherein said control means are operable to select the switch unit-memory pairs such that in the reading phase all switch units that retrieve stored data simultaneously from their respective paired memories do so via different bus line units.

15. The switching apparatus as claimed in claim 14, wherein each switch unit includes an adaptive switch element connected to said control means for receiving therefrom control information, identifying the selected switch unit-memory pairs for that switch unit in said reading phase, and operable in accordance with that control information to activate the appropriate bus line units in turn over the course of the reading phase to facilitate data transfer from the memory to the switch unit of each selected pair for the switch unit concerned.

16. The switching apparatus as claimed in claim 15, wherein each switch unit further includes bus multiplexer means having a first port connected to said adaptive switch element of the unit concerned and a plurality of further ports connected respectively to said bus line units, any one of which further ports can be designated for data and address signal transfer between it and the first port by application to the bus multiplexer means of a selection signal generated by the adaptive switch element of the unit concerned.

17. A switching apparatus, comprising:

a plurality of switch units, each including memory having storage regions corresponding respectively to the other switch units of said plurality, the apparatus having a writing phase in which, when data is received by a first one of the switch units for output by a second one of the switch units, the first switch unit stores the received data in the storage region of its memory that corresponds to the second switch unit, and also having a reading phase in which the second switch unit retrieves the stored data from its corresponding storage region in the first switch-unit and outputs that data; and wherein said memory of each switch unit is employed to provide virtual first-in-first-out memory blocks corresponding respectively to said storage regions, each block having respective write and read pointers, also stored in the memory of the switch unit concerned, for use by the switch units when storing data in and retrieving data from the corresponding storage region.

18. A switching apparatus, comprising:

a plurality of switch units, each including memory having storage regions corresponding respectively to the other switch units of said plurality, the apparatus having a writing phase in which, when data is received by a first one of the switch units for output by a second one of the switch units, the first switch unit stores the received data in the storage region of its memory that corresponds to the second switch unit, and also having a reading phase in which the second switch unit retrieves the stored data from its corresponding storage region in the first switch-unit memory and outputs that data, wherein each switch unit has multicast handling means operative, when multicast data is received by the switch unit concerned for output by a plurality of designated other switch units, to store the received multicast data in the storage region of its memory that corresponds to just a first one of those designated switch units and to store in the storage regions corresponding respectively to the remaining switch units a multicast address pointer indicating the location of the multicast data in the storage region corresponding to the first designated switch unit.

19. A switching apparatus, comprising:

a plurality of switch units, each including memory having storage regions corresponding respectively to the other switch units of said plurality, the apparatus having a writing phase in which, when data is received by a first one of the switch units for output by a second one of the switch units, the first switch unit stores the received data in the storage region of its memory that corresponds to the second switch unit, and also having a reading phase in which the second switch unit retrieves the stored data from its corresponding storage region in the first switch-unit memory and outputs that data, wherein each memory has respective writing and reading ports and is adapted such that data can be written to said writing port at the same time as data is retrieved from said reading port, and the reading port of the memory of each switch unit is connected to all other switch units, with the writing port of the memory of each switch unit not connected to any other switch units, whereby in said reading phase data received by each switch unit can be stored in the memory of that unit while previously stored data is retrieved by another switch unit.

20. A switching apparatus, comprising:

a plurality of switch units, each including memory having storage regions corresponding respectively to the other switch units of said plurality, the apparatus having a writing phase in which, when data is received by a first one of the switch units for output by a second one of the switch units, the first switch unit stores the received data in the storage region of its memory that corresponds to the second switch unit, and also having a reading phase in which the second switch unit retrieves the stored data from its corresponding storage region in the first switch-unit memory and outputs that data, wherein each switch unit includes a switch port control portion, connected to respective input and output ports of the switch unit, and operable when data is received at said input port to produce a routing tag identifying the storage region in the switch unit's memory in which the received data is to be stored.

21. Switching apparatus comprising a plurality of switch units, each including a memory having storage regions which correspond respectively to the other switch units of said plurality and which are accessible resgectively be those corresponding other switch units of said plurality, wherein the switch units are operable to perform simultaneous access operations in which two or more switch units access respective storage regions simultaneously, and in at least one such simultaneous access operation the accessed storage regions only correspond to different respective switch units, the switching apparatus having a writing phase in which, when data is received by a first one of the switch units for output by a second one of the switch units, the first switch unit stores the received data in the storage region of its memory that corresponds to the second switch unit, and also having a reading phase in which the second switch unit retrieves the stored data from its corresponding storage region in the first-switch-unit memory and outputs that data.

* * * * *

UNITED STATES PATENT AND TRADEMARK OFFICE
CERTIFICATE OF CORRECTION

PATENT NO.: 6,011,793
DATED : January 4, 2000
INVENTOR(S): Graeme Roy SMITH

It is certified that [an/error[s]] appears in the above-identified patent and that said Letters Patent is hereby corrected as shown below:

Claim 10, line 58, Col. 14, delete "The Switching" and change "apparatus" to --Apparatus--.

Claim 21, line 22, Col. 18, change "respectively be" to --respectively by--.

Signed and Sealed this

Twenty-first Day of November, 2000

Attest:

Q. TODD DICKINSON

Attesting Officer

Director of Patents and Trademarks